(12) United States Patent
Schadow et al.

(10) Patent No.: US 8,586,879 B2
(45) Date of Patent: Nov. 19, 2013

(54) CABLE KINK PROTECTION UNIT AND METHOD FOR PRODUCING SAME

(75) Inventors: Joachim Schadow, Stuttgart (DE); Joerg Maute, Sindelfingen (DE); Peter Stierle, Pliezhausen (DE); Manfred Lutz, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 195 days.

(21) Appl. No.: 13/181,985

(22) Filed: Jul. 13, 2011

(65) Prior Publication Data
US 2012/0014048 A1   Jan. 19, 2012

(30) Foreign Application Priority Data
Jul. 14, 2010 (DE) .......................... 10 2010 031 309

(51) Int. Cl.
*H02G 3/18* (2006.01)
(52) U.S. Cl.
USPC ........... 174/650; 174/659; 174/664; 174/481; 174/19

(58) Field of Classification Search
USPC ............. 174/650, 659, 664, 481, 18, 69, 662, 174/658, 19; 439/110
See application file for complete search history.

(56) References Cited

U.S. PATENT DOCUMENTS

| | | | | |
|---|---|---|---|---|
| 3,910,448 A | * | 10/1975 | Evans et al. ..................... | 220/3.8 |
| 4,698,459 A | * | 10/1987 | Drake ......................... | 174/138 F |
| 4,864,080 A | * | 9/1989 | Fochler et al. ................. | 174/664 |
| 5,153,380 A | * | 10/1992 | Chang ............................ | 174/561 |
| 5,390,465 A | * | 2/1995 | Rajecki ........................ | 52/741.3 |
| 6,521,833 B1 | * | 2/2003 | DeFreitas ..................... | 174/660 |

FOREIGN PATENT DOCUMENTS

EP          2020277          2/2009

* cited by examiner

*Primary Examiner* — Dhirubhai R Patel
(74) *Attorney, Agent, or Firm* — Maginot, Moore & Beck

(57) ABSTRACT

A cable kink protection unit, in particular a cable kink protection unit of a portable tool, includes at least one basic body unit. The cable kink protection unit has at least one electric device housing unit integrally connected to the basic body unit.

12 Claims, 3 Drawing Sheets

CABLE KINK PROTECTION UNIT AND METHOD FOR PRODUCING SAME

This application claims priority under 35 U.S.C. §119 to German patent application no. DE 10 2010 031 309.2, filed Jul. 14, 2010 in Germany, the disclosure of which is incorporated herein by reference in its entirety.

BACKGROUND

A cable kink protection unit for a portable power tool comprising an articulation part and an injected sleeve part is known from publication EP 2 020 277 A1.

SUMMARY

The disclosure relates to a cable kink protection unit, in particular a cable kink protection unit of a portable tool, comprising at least one basic body unit.

It is proposed that the cable kink protection unit has at least one electric device housing unit integrally connected to the basic body unit. In this case, an "electric device housing unit" is intended in particular to refer to a unit which comprises a wall which has a wall inner surface which defines a housing interior space. A "wall inner surface" is intended in particular to refer to a surface which differs at least substantially from a wall end face, which is defined at least with by a material thickness. A "housing interior space" is intended in particular to refer to a space which is provided for accommodating electric device elements differing from a power cable and in which, in particular in the assembled state of an electric device, in particular of a portable power tool, having the cable kink protection unit, electric device elements differing from a power cable are arranged. The electric device housing unit preferably has at least one wall whose inner surface extends in a direction which has at least one direction component perpendicular to an axial direction of the basic body unit and/or which, in at least one region, is at a distance of at least 1 cm and preferably at least 2 cm from a power cable contact surface of the basic body unit. In this case, the electric device housing unit can be formed by various housing units which appear appropriate to a person skilled in the art, such as by at least one housing shell which is provided for being coupled to a further housing shell, by a motor housing which is provided for accommodating a motor, or preferably by a housing lid which is provided for closing an aperture in another housing unit and is in particular smaller than at least one other housing unit. The expression "provided" is intended in particular to mean specially equipped and/or designed. A "basic body unit" of the cable kink protection unit is intended in particular to refer to a unit which has an inner surface which is provided for making contact with a power cable and is in contact with a power cable in the assembled state. Furthermore, an "integral connection" is intended in particular to refer to a connection in which the connecting parts are held together by atomic or molecular forces in particular in a non-detachable manner and can be separated in particular only by destroying at least one of the connecting parts. The integral connection is preferably produced by a brazing, welding, adhesive bonding, vulcanizing, casting and/or injection molding operation. An especially advantageous transition between the basic body unit and the electric device housing unit can be achieved by an appropriate configuration. In particular, an advantageously waterproof and/or dustproof connection between the basic body unit and the electric device housing unit can be achieved. Advantageous stabilizing of the basic body unit can be achieved at a point connected to the electric device housing unit, specifically if the electric device housing unit is formed from a material that is harder, in particular flexurally stiffer, than the basic body unit. Furthermore, components, assembly effort and/or costs can be saved.

If the basic body unit and the electric device housing unit form a multi-component injection molding, especially simple and flexible production can be achieved. In this case, a "multi-component injection molding" is intended in particular to refer to a component in which at least one component made of a first material is encapsulated with at least a second material and/or in which at least two components made of different materials are injected in an injection molding process and are integrally connected by the injection molding process. By an appropriate configuration, various materials can be combined in a cost-effective manner and additional operations, following an injection molding operation, for producing an integral connection can be avoided. In principle, however, other methods for achieving an integral connection which appear appropriate to the person skilled in the art are conceivable, such as, in particular, a welding process, an adhesive bonding process, etc.

In a further configuration of the disclosure, it is proposed that the cable kink protection unit has least one damping and/or sealing element which in particular is integrally connected directly to the basic body unit and/or, especially preferably, is in particular integrally connected directly to the electric device housing unit and is provided for coupling to a third component. In this case, a "damping element" is intended in particular to refer to an element which is provided specifically for damping vibrations and is formed in particular from a material that is more flexible than at least one of the components which are directly connected to one another via the damping element. A "sealing element" is intended in particular to refer to an element which is provided specifically for sealing between two components and is preferably formed from a material that is more flexible than at least one of the components which are directly connected to one another via the sealing element. The sealing element can be formed by a labyrinth seal and/or preferably by a sealing lip and/or a sealing bead. The sealing element and/or the damping element preferably are/is at least partly made of the same material as the basic body unit. The functionality of the cable kink protection unit can be further increased by an appropriate configuration.

Furthermore, it is proposed that the electric device housing unit has at least one aperture in which the basic body unit at least partly engages, as a result of which, in addition to an integral connection, an especially advantageous positive-locking connection can be achieved. The aperture can be formed by a recess, but is preferably formed by a through-aperture which extends through the entire wall thickness of the electric device housing unit, and the basic body unit preferably passes through said through-aperture.

If the cable kink protection unit has at least one reinforcing element which projects in the axial direction beyond at least one connecting region between the basic body unit and the electric device housing unit, an advantageous bending line at a certain bending load or an advantageous course of bending stiffness in the axial direction of the cable kink protection unit can be achieved. In this case, a "connecting region" is intended in particular to refer to a cohesive contact region between the basic body unit and the electric device housing unit. The expression "axial direction" is intended in particular to refer to a direction in which the basic body unit and in particular the cable kink protection unit itself has a main extent. Furthermore, a "reinforcing element" is intended in particular to refer to an element which is formed at least partly from a material differing from the basic body unit, in particular a harder material.

In an especially preferred manner, the reinforcing element is in particular integrally connected directly to the electric device housing unit, as a result of which an advantageous production process can be achieved, to be precise in particular if the reinforcing element is formed at least partly from the same material as the electric device housing unit.

In a further configuration, it is proposed that the reinforcing element has a wall thickness varying in the axial direction, as a result of which an advantageous course of the flexural stiffness of the cable kink protection unit can be achieved, to be precise in particular if, starting from a connecting point between the basic body unit and the electric device housing unit, the wall thickness of the reinforcing element decreases in a direction facing away from the connecting point.

Furthermore, it is proposed that the reinforcing element has a screw, spiral and/or ring structure. In this case, a "ring structure" is intended in particular to refer to a structure which has individual rings, and a "ring" is intended in particular to refer to a component having a wall which encloses a free space, preferably in a circle, and which has a width which is smaller than a transverse extent, such as in particular a diameter of the component. The rings in this case can be connected separately from one another and/or can preferably be connected at least partly, in particular integrally, such as in particular on a radially inner region, for example via a sleeve integrally formed in one piece. A "spiral structure" is intended in particular to refer to a structure which in particular has a spirally cohesive wall which, as viewed in the longitudinal direction of the wall, follows a curve which runs around a point or around an axis and, depending on the running direction, moves away from or approaches said point or said axis. A "screw structure" is intended in particular to refer to a structure which has a wall which follows a curve which winds with a pitch or with various pitches around a lateral surface of a cylinder and/or cone. In this case, there may in particular be a structure which has at least the features of two of the structures defined here. By an appropriate configuration, flexibly advantageous bending courses can be achieved and in particular advantageously simple stops can be realized, said stops being provided for countering further deformation.

BRIEF DESCRIPTION OF THE DRAWING

Further advantages follow from the description of the drawing below. Exemplary embodiments of the disclosure are set forth below and contain numerous features in combination. The person skilled in the art will also expediently consider the features individually and combine them to form appropriate further combinations.

In the drawing.

DETAILED DESCRIPTION

Figure 1:
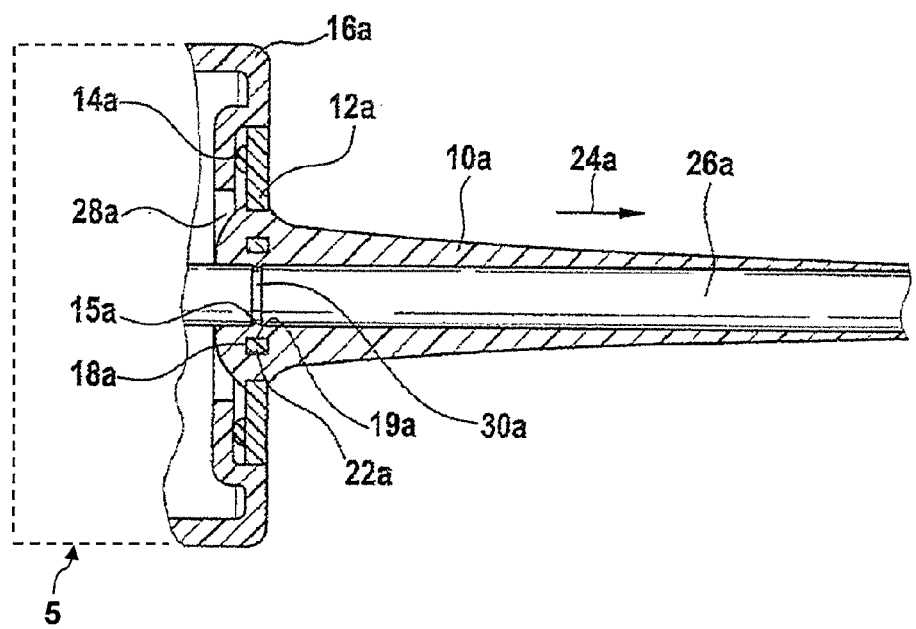
FIG. 1 shows a detail of a schematic sectional illustration of a portable power tool having a cable kink protection unit.

FIG. 1 shows a detail of a schematic sectional illustration of a portable power tool 5 (schematically shown), specifically an angle grinder, having a cable kink protection unit. The cable kink protection unit has a basic body unit 10a. The basic body unit 10a is formed by a sleeve-shaped component which is arranged on an end of an electric cable 26a, said end facing the portable power tool, and encloses a protective sheath of the electric cable 26a, said protective sheath enclosing a plurality of current-carrying wires. The basic body unit 10a has a decreasing wall thickness in an axial direction 24a facing away from a connection to the portable power tool.

Figure 2:
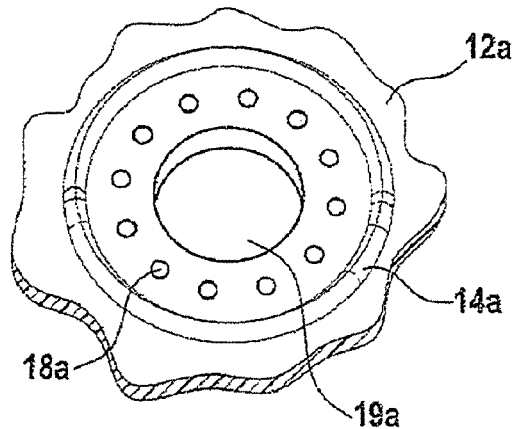
FIG. 2 shows a detail of an electric device housing unit of the cable kink protection unit from FIG. 1.

The cable kink protection unit has an electric device housing unit 12a integrally connected to the basic body unit 10a. The basic body unit 10a and the electric device housing unit 12a are produced by a multi-component injection molding process and form a multi-component injection molding. In its central region, the electric device housing unit 12a has a central aperture 19a, through which the basic body unit 10a passes (FIGS. 1 and 2). The aperture 19a is surrounded in the radially inner region by the basic body unit 10a or is encapsulated by a material of the basic body unit 10a. Furthermore, the electric device housing unit 12a has apertures 18a, specifically through-apertures, at a radial distance from the central aperture 19a. The electric device housing unit 12a has a perforated structure. The apertures 18a are arranged one behind the other in the circumferential direction. The apertures 18a are arranged so as to be uniformly distributed in the circumferential direction, and the basic body unit 10a passes through said apertures in a positive-locking and integral manner.

The cable kink protection unit has a damping and sealing element 15a which is integrally connected directly to the basic body unit 10a and is provided for coupling to the electric cable 26a. The damping and sealing element 15a is formed by a sealing bead which is integrally formed on the inner circumference of the basic body unit 10a and which, in the assembled state, engages in an annular groove 30a integrally formed on the electric cable 26a. In principle, an annular groove 30a could also be dispensed with. The damping and sealing element 15a and the electric device housing unit 12a are arranged in a common plane running perpendicularly to the axial direction 24 of the cable kink protection unit, thereby achieving advantageous stability in the region of the damping and sealing element 15a. Furthermore, the cable kink protection unit has a damping and sealing element 14a which is integrally connected directly to the electric device housing unit 12a and is provided for coupling to a further housing part 16a of the portable power tool. The damping and sealing element 14a is injected onto the electric device housing unit 12a on a side facing the housing part 16a. The damping and sealing element 14a is formed from a material differing from the electric device housing unit 12a. The basic body unit 10a and the damping and sealing element 14a are formed from the same material. The basic body unit 10a is formed from a material that is more flexible than the electric device housing unit 12a, specifically from a flexible plastic. The electric device housing unit 12a is likewise made of plastic. The electric device housing unit 12a is formed by a housing lid which is provided for closing a housing aperture 28a of the housing part 16a. For this purpose, the electric device housing unit 12a, starting from a radially outermost region 22a connected to the basic body unit 10a, extends in the radial direction beyond the basic body unit 10a.

Figure 3:
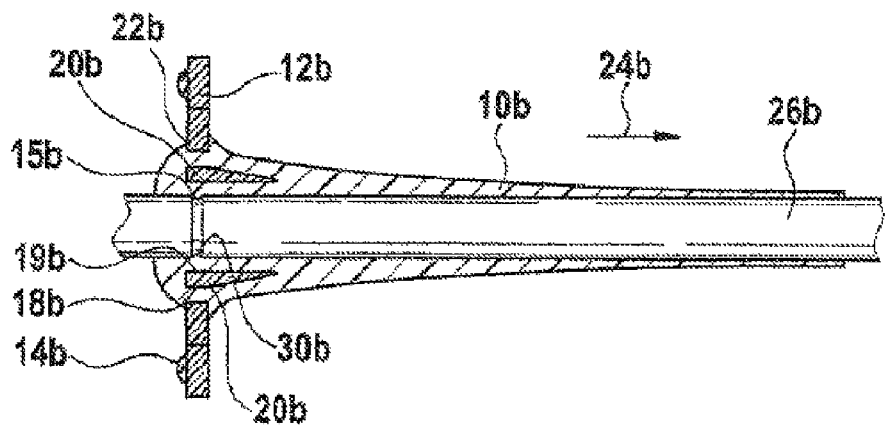
FIG. 3 shows a sectional illustration of an alternative cable kink protection unit.
Figure 4:
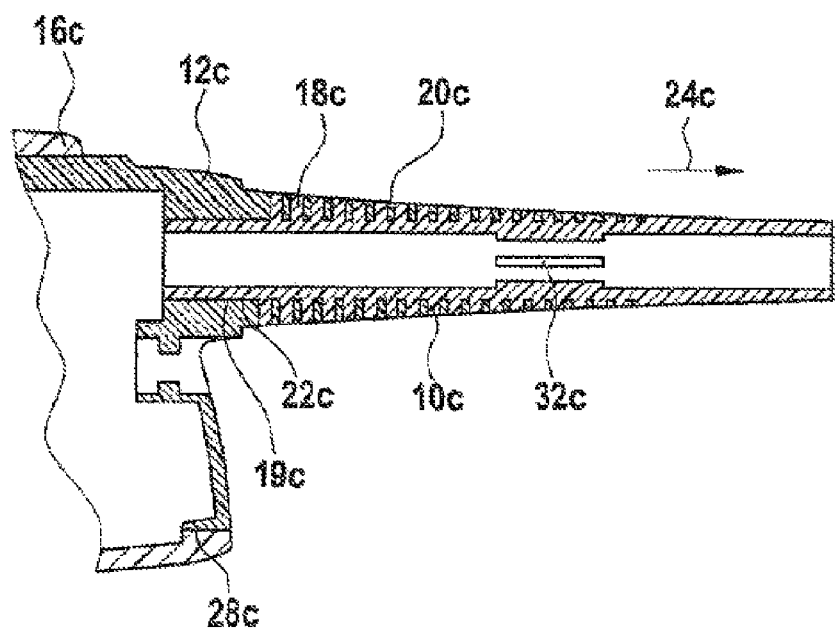
FIG. 4 shows a detail of a sectional illustration of an alternative portable power tool having a cable kink protection unit.
Figure 5:
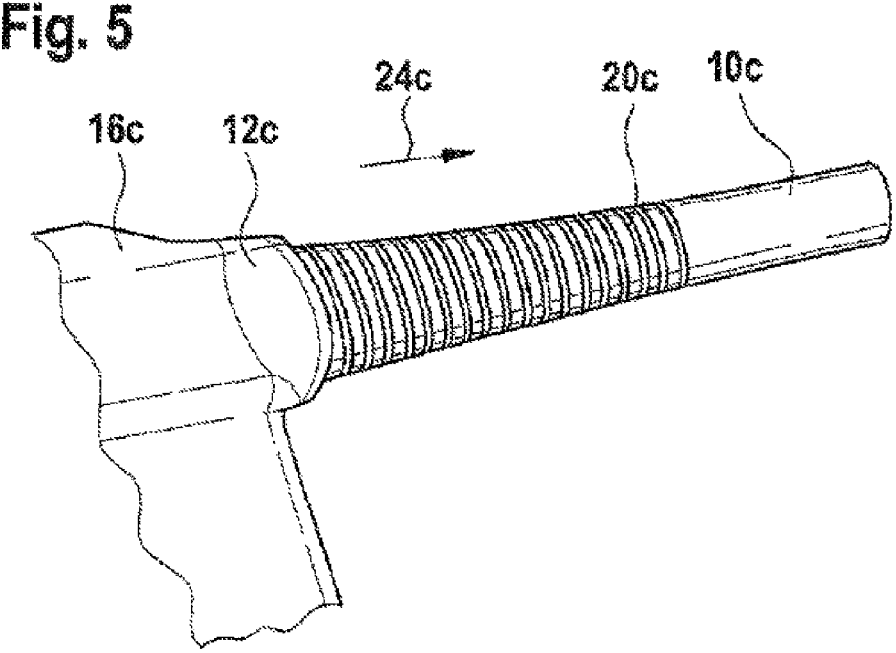
FIG. 5 shows a detail of a view of the portable power tool from FIG. 4 obliquely from above.

Further exemplary embodiments of cable kink protection units are shown in FIGS. 3 to 5. Components, features and functions which remain the same are in principle provided with the same designations, the letters a to c being attached to the designations in order to distinguish between the exemplary embodiments. The descriptions below are restricted substantially to the differences between the exemplary embodiments, and reference can be made to the description of the exemplary embodiment in FIGS. 1 and 2 with respect to components, features and functions which remain the same.

The cable kink protection unit in FIG. 3 has a reinforcing element 20b which projects in the axial direction 24b beyond a connecting region 22b between a basic body unit 10b of the cable kink protection unit and an electric device housing unit 12b of the cable kink protection unit. The reinforcing element 20b is integrally connected directly to the electric device housing unit 12b. The reinforcing element 20b and the electric device housing unit 12b are made in one piece from the same material in an injection molding operation. The electric device housing unit 12b has, in a manner corresponding to the electric device housing unit 12a, an inner aperture 19b and apertures 18b at a distance therefrom radially on the outside. The reinforcing element 20b is arranged radially inside the apertures 18b and is encapsulated by the material of the basic body unit 10b. The reinforcing element 20b is of sleeve-shaped design and has a decreasing wall thickness in the axial direction 24b of the basic body unit 10b. As an alternative to or in addition to a sleeve-shaped reinforcing element 20b, a plurality of individual reinforcing elements distributed in particular in the circumferential direction are also conceivable. During production, desired flexural stiffness can be achieved by a length, position, shape and/or thickness of the reinforcing element 20b and/or of other reinforcing elements.

Figure 6:
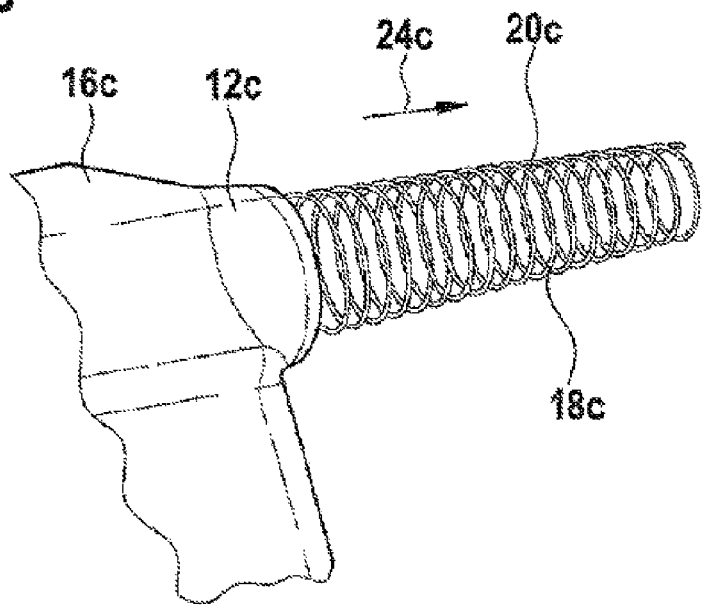
FIG. 6 shows the detail according to FIG. 5 with a flexible component of the cable kink protection unit removed.

The cable kink protection unit in FIGS. 4 to 6 has a reinforcing element 20c having a screw structure. The reinforcing element 20c is integrally connected directly to an electric device housing unit 12c of the cable kink protection unit. The reinforcing element 20c and the electric device housing unit 12c are made in one piece from the same material in an injection molding operation. The reinforcing element 20c forms a supporting structure which is encapsulated by a material of a basic body unit 10c of the cable kink protection unit. The basic body unit 10c forms an inner sleeve which extends over the entire length of the cable kink protection unit and which has an inner surface for coupling to an electric cable. Webs 32c running in the axial direction 24c for compensating for play between the basic body unit 10c and the electric cable are integrally formed on the inner surface of the inner sleeve. The basic body unit 10c has a decreasing wall thickness in the axial direction 24c facing away from a connection to a portable power tool. Furthermore, the reinforcing element 20c has a decreasing wall thickness in the axial direction 24c. The reinforcing element 20c is visible from outside, specifically by virtue of the fact that surfaces of the reinforcing element 20c which point radially outward are excluded from an encapsulation. In principle, however, the reinforcing element 20c could also be completely encapsulated.

What is claimed is:

1. A portable tool assembly, comprising:
a portable power tool having (i) a tool housing part defining a cavity and a housing aperture leading to the cavity, and (ii) an electric cable possessing a plurality of current carrying wires, the electric cable extending from the cavity through the housing aperture; and
a cable kink protection unit having (i) a sleeve defining a passageway through which the electric cable extends, and (ii) a housing lid attached to the tool housing part, the housing lid having a lid aperture through which the sleeve extends,
wherein the cable kink protection unit is prepared by a process including integrally connecting the sleeve and housing lid together in an injection molding process.

2. The portable power tool assembly of claim 1, wherein:
the housing lid includes a housing facing surface,
the cable kink protection unit further has a damping and sealing element supported on the housing facing surface, and
the damping and sealing element is positioned in contact with the tool housing part.

3. The portable power tool assembly of claim 2, wherein the damping and sealing element is configured to encircle the lid aperture.

4. The portable power tool assembly of claim 3, wherein:
the housing lid further defines a plurality of perforation apertures circumferentially distributed around the lid aperture, and
the plurality of perforation apertures are interposed between the damping and sealing element and the lid aperture.

5. The portable power tool assembly of claim 3, wherein portions of the sleeve respectively extend through the plurality of perforation apertures.

6. The portable power tool assembly of claim 2, wherein the cable kink protection unit is further prepared by a process including injecting the damping and sealing element on the housing facing surface.

7. The portable power tool assembly of claim 1, wherein:
the tool housing part includes an indentation structure defining a mounting recess,
the indentation structure defines the housing aperture, and
the housing lid is located in the mounting recess.

8. The portable power tool assembly of claim 7, wherein the lid aperture is located in the mounting recess.

9. The portable power tool assembly of claim 1, wherein the portable power tool is an angle grinder.

10. The portable power tool assembly of claim 1, wherein:
the electric cable defines an annular groove,
the sleeve includes an interior surface defining the passageway, and
the sleeve includes a sealing bead projecting from the interior surface and extending into the annular groove.

11. The portable power tool assembly of claim 1, wherein:
the sleeve includes an exterior surface defining an exterior sleeve recess,
the housing lid includes an aperture structure that defines the lid aperture, and
the aperture structure is positioned in the exterior sleeve recess.

12. The portable power tool assembly of claim 1, wherein:
the tool housing part includes an indentation structure defining a mounting recess,
the indentation structure defines the housing aperture,
the housing lid includes a housing facing surface,
the cable kink protection unit further has a damping and sealing element supported on the housing facing surface,
the damping and sealing element is positioned in contact with the tool housing part,
the housing lid further defines a plurality of perforation apertures circumferentially distributed around the lid aperture,
the plurality of perforation apertures are interposed between the damping and sealing element and the lid aperture,
the electric cable defines an annular groove,
the sleeve includes an interior surface defining the passageway, the sleeve includes (i) a sealing bead projecting from the interior surface and extending into the annular groove, and (ii) the sleeve includes an exterior surface defining an exterior sleeve recess, the housing lid includes an aperture structure that defines the lid aperture, the aperture structure is positioned in the exterior sleeve recess, and the following are located in the mounting recess, (i) the housing lid, (ii) the damping and sealing element, (iii) the plurality of perforation apertures, (iv) the annular groove of the electric cable, (v) the sealing bead, (vi) the exterior sleeve recess, and (vii) the aperture structure of the housing lid.

\* \* \* \* \*

UNITED STATES PATENT AND TRADEMARK OFFICE
CERTIFICATE OF CORRECTION

| | |
|---|---|
| PATENT NO. | : 8,586,879 B2 |
| APPLICATION NO. | : 13/181985 |
| DATED | : November 19, 2013 |
| INVENTOR(S) | : Schadow et al. |

It is certified that error appears in the above-identified patent and that said Letters Patent is hereby corrected as shown below:

In the Claims

In column 6, line 18, in claim 5, please replace

"The portable power tool assembly of claim 3,"

with

--The portable power tool assembly of claim 4,--

Signed and Sealed this
Twenty-seventh Day of May, 2014

Michelle K. Lee
*Deputy Director of the United States Patent and Trademark Office*